United States Patent
Liu et al.

(10) Patent No.: US 10,576,554 B2
(45) Date of Patent: Mar. 3, 2020

(54) DEVICE FOR CORRECTING ALUMINUM ALLOY WHEEL

(71) Applicant: CITIC Dicastal CO., LTD, Qinhuangdao (CN)

(72) Inventors: Huiying Liu, Qinhuangdao (CN); Zhiyuan Yu, Qinhuangdao (CN); Yao Zheng, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 0 days.

(21) Appl. No.: 16/172,097

(22) Filed: Oct. 26, 2018

(65) Prior Publication Data
US 2019/0126363 A1 May 2, 2019

(30) Foreign Application Priority Data
Oct. 31, 2017 (CN) .................. 2017 1 10490439

(51) Int. Cl.
*B23B 5/28* (2006.01)
*B23B 39/22* (2006.01)
(Continued)

(52) U.S. Cl.
CPC .................. *B23C 3/12* (2013.01); *B23B 5/28* (2013.01); *B23B 35/00* (2013.01); *B23B 39/22* (2013.01);
(Continued)

(58) Field of Classification Search
CPC . B23B 2215/08; B23B 2220/32; B23B 39/22; B23B 35/00; B23B 2228/21; B23B 2247/08; B23C 2215/085; Y10T 408/44; Y10T 408/378; Y10T 408/3788; Y10T 408/3792; Y10T 40/375;
(Continued)

(56) References Cited

U.S. PATENT DOCUMENTS 2,657,063 A * 10/1953 Trosch ...................... B23B 5/28
279/71
4,866,834 A * 9/1989 Winkler .................. B23B 41/00
483/1
(Continued)

FOREIGN PATENT DOCUMENTS

| CN | 104923809 A | 9/2015 |
| CN | 106938417 A | 7/2017 |
| JP | H08267318 A | 10/1996 |

*Primary Examiner* — Nicole N Ramos
(74) *Attorney, Agent, or Firm* — Calfee, Halter & Griswold LLP

(57) ABSTRACT

The present application provides a device for correcting an aluminum alloy wheel, which is mainly composed of a frame, an expansion cylinder, a correction motor, a feed motor and the like. A hub positioning unit initially positions a hub to prepare for positioning a center hole expansion sleeve; a hub feed unit performs precise center hole positioning on the hub and completes upward feed movement of the hub; and a tool correction unit completes hub correction through a rotating standard correction cutter head. The device may meet the process requirements of wheels in flow production, improve the runout and balance qualified rate of products, and solve the problems of decentraction of the outer diameter in the first procedure and the second procedure and deformation of rim bulges.

1 Claim, 4 Drawing Sheets

(51) Int. Cl.
 *B23B 35/00* (2006.01)
 *B23C 3/12* (2006.01)
(52) U.S. Cl.
 CPC ..... *B23B 2215/08* (2013.01); *B23C 2215/085* (2013.01)
(58) Field of Classification Search
 CPC .... Y10T 409/303976; B23Q 2039/002; B23Q 2039/006
 See application file for complete search history.

(56) References Cited

U.S. PATENT DOCUMENTS

| | | | |
|---|---|---|---|
| 8,172,489 B2* | 5/2012 | Prust | B23B 31/16275 269/134 |
| 9,616,499 B1 | 4/2017 | Fong | |
| 2001/0039732 A1* | 11/2001 | Smyth | B23P 15/00 29/894.35 |
| 2004/0170769 A1* | 9/2004 | Gatton | B23B 5/02 427/402 |
| 2005/0120557 A1* | 6/2005 | Gatton | B23B 5/02 29/894.32 |
| 2006/0042091 A1* | 3/2006 | Luschei | B23B 1/00 29/894.35 |
| 2011/0068544 A1* | 3/2011 | Prust | B23B 31/16275 279/4.02 |
| 2012/0073413 A1* | 3/2012 | Len | B23B 5/00 82/104 |
| 2014/0271016 A1* | 9/2014 | Chou | B23B 31/185 409/224 |
| 2016/0052067 A1* | 2/2016 | Stricklen | B23B 39/161 408/1 BD |
| 2016/0346844 A1 | 12/2016 | Xue et al. | |
| 2018/0071828 A1* | 3/2018 | Sun | B23B 5/28 |

* cited by examiner

DEVICE FOR CORRECTING ALUMINUM ALLOY WHEEL

CROSS-REFERENCE TO RELATED APPLICATIONS

This application claims priority to Chinese Patent Application No. 201711049043.9 filed on Oct. 31, 2017, which is hereby incorporated by reference in its entirety.

TECHNICAL FIELD

The present application relates to the technical field of manufacturing of hubs, specifically to a device for correcting an aluminum alloy wheel.

BACKGROUND ART

At present, an aluminum alloy wheel is mostly machined by adopting a first-procedure and second-procedure synthetic process, that is, the first procedure machines half of the wheel by means of positioning of the front casting lip; and the second procedure machines the remaining half by means of positioning of the inner rim completed by first-procedure machining. Such process greatly improves the production efficiency, but has the disadvantage that the machining of the first procedure and the second procedure completed on two lathes needs secondary positioning and clamping, causing the problem of decentraction of the parts machined in the first procedure and the second procedure, which results in wheel runout and balance out of tolerance and may also result in tire mounting failure, air leakage caused by excessive gap and other safety problems. In addition, the front casting wheel has bulges and joint edges at the rim due to the casting deformation, and the deformation of these bulges may cause runout and balance out of tolerance. Therefore, it is necessary to correct a semi-finished product after machining to solve the problems of deformation of the front rim and decentraction caused by the first procedure and the second procedure. Based on this situation, the present patent provides a wheel correcting device for solving the problems of decentraction of the outer diameter and deformation of rim bulges in the first procedure and the second procedure.

SUMMARY OF THE INVENTION

The object of the present application is to provide a wheel correcting device, which may be used in a wheel flow production line to correct the problems of decentraction of the outer diameter and deformation of rim bulges in the first procedure and the second procedure and improve runout and balance of the wheel.

In order to achieve the above object, the technical solution of the present application is: a wheel correcting device is mainly composed of three parts: a hub positioning unit, a hub feed unit, and a tool correction unit. The hub positioning unit initially positions a hub to prepare for positioning a center hole expansion sleeve; the hub feed unit performs precise center hole positioning on the hub and completes upward feed movement of the hub; and the tool correction unit completes hub correction through a rotating standard correction cutter head.

A device for correcting an aluminum alloy wheel includes a frame, a feed lower support plate, a feed sliding plate, an expansion cylinder, an axial positioning plate, an expansion sleeve, an expansion core, a correction cutter head, a bearing, a correction motor, a coupling, a shaft, positioning rods, positioning sliding blocks, positioning guide rails, positioning support plates, positioning cylinders, a feed guide rail, a reinforcing rib, a ball, a lead screw, a feed side support plate and a feed motor; the device for correcting an aluminum alloy wheel comprises a hub positioning unit, in which the positioning support plates are mounted on the frame, the positioning guide rails are mounted on the positioning support plate, the positioning sliding blocks are connected to the positioning guide rails, the positioning rods are fixed on the positioning sliding blocks, the four positioning cylinders are respectively connected with the four positioning sliding blocks to drive the four positioning sliding blocks to move synchronously so as to control synchronous centering of the four positioning rods and complete initial positioning of a hub; the device for correcting an aluminum alloy wheel comprises a hub feed unit, in which the feed side support plate and the feed motor are mounted on the feed lower support plate, the feed side support plate is connected with the frame through the reinforcing rib to play a role in stabilizing, the axial positioning plate completes axial positioning of the hub, the expansion cylinder drives the expansion core to complete radial positioning of the hub, the hub is fixed while being expanded, the feed motor drives the feed sliding plate to move up and down through the ball and the screw so as to drive the fixed hub to achieve up-down feed movement; and the device for correcting an aluminum alloy wheel comprises a tool correction unit, in which stepped cutting edges having different outer diameters are annularly distributed in the correction cutter head, a standard outer diameter cutting edge is composed of three parts, lower cutting edge is vertical, upper cutting edge is at an angle of degrees to the horizontal line, middle connection part is an R. arc cutting edge, the correction motor may control the rotation of the correction cutter head.

The working process of the wheel correcting device is as follows: the correction motor is started first so that the correction cutter head is always in a rotating state, a machined semi-finished product reaches a position below the device, the four positioning cylinders move synchronously to center the hub and complete initial positioning of the hub, then the feed motor is started to drive the feed sliding plate to move up, the feed sliding plate stops moving when the axial positioning plate contacts flange surface of the hub, the expansion cylinder is started to expand the hub, then the positioning cylinders are reset, the positioning rods leave the hub, next, the feed motor is started again to drive the hub to move up continuously, the hub stops moving when fillets of wheel rim contact fillets of the stepped cutting edges, the hub is lowered onto a roller bed after the correcting, the expansion sleeve is released, the hub feed unit is reset, the roller bed rotates to carry away the corrected hub and receives next wheel to be corrected, and so on.

The device of the present application may meet the process requirements of wheels in flow production, improve the runout and balance qualified rate of products and solve the problems of decentraction of the outer diameter in the first procedure and the second procedure and deformation of rim bulges, and has the characteristics of simple operation, high efficiency, practicability, convenient manufacture and the like.

Figure 1:
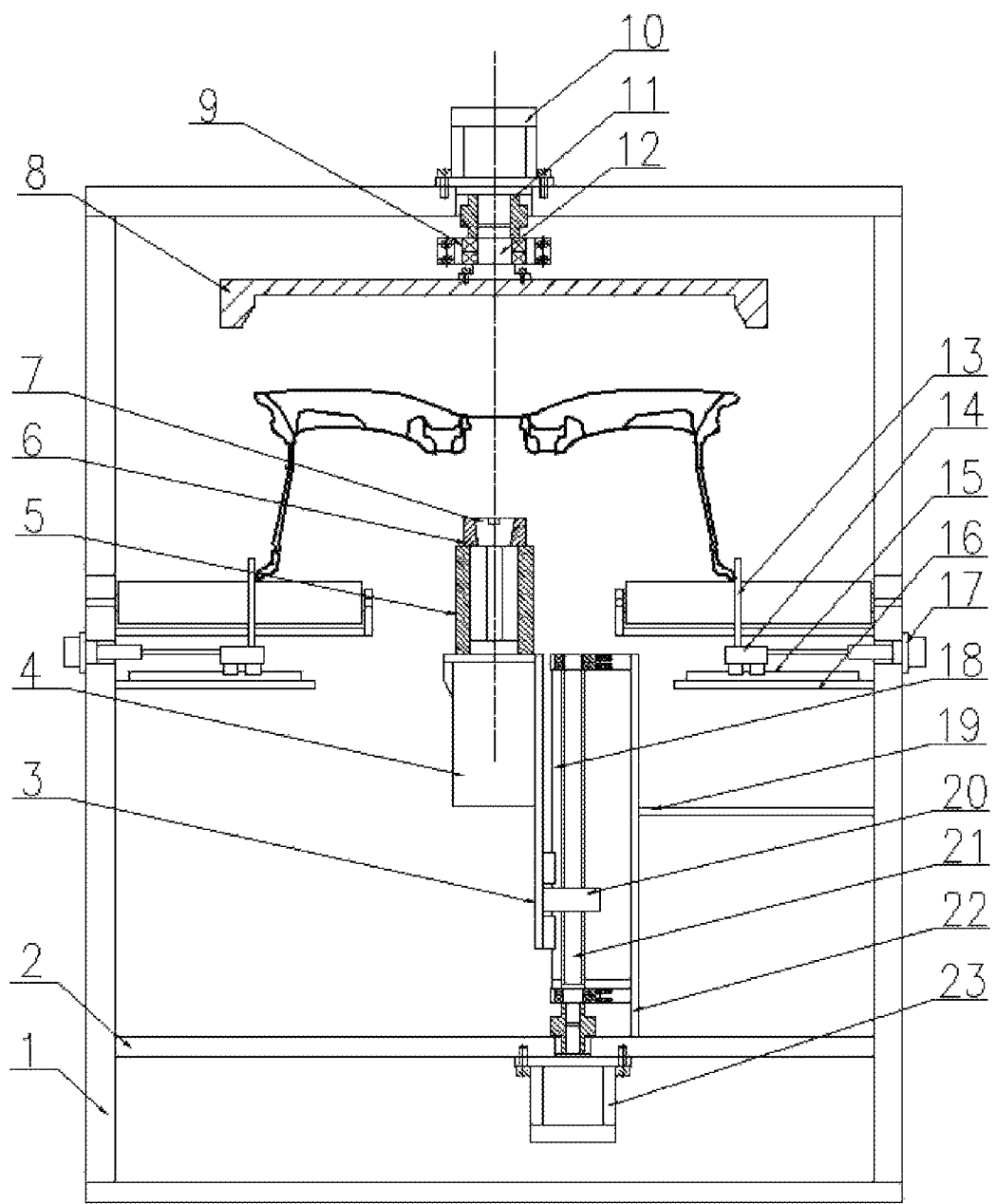
FIG. 1 is a front view of a wheel correcting device according to the present application.
Figure 2:
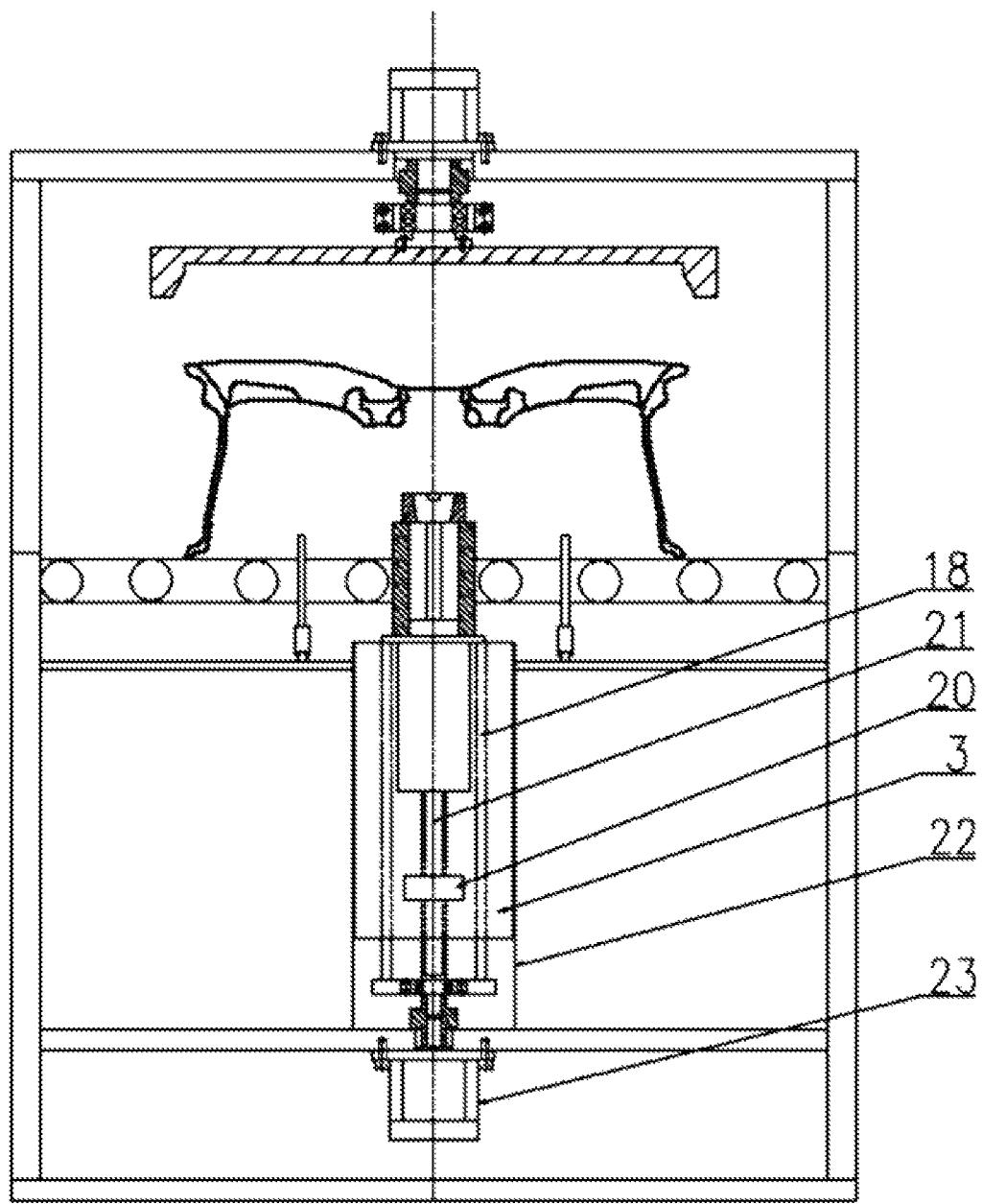
FIG. 2 is a left view of the wheel correcting device according to the present application.
Figure 3:
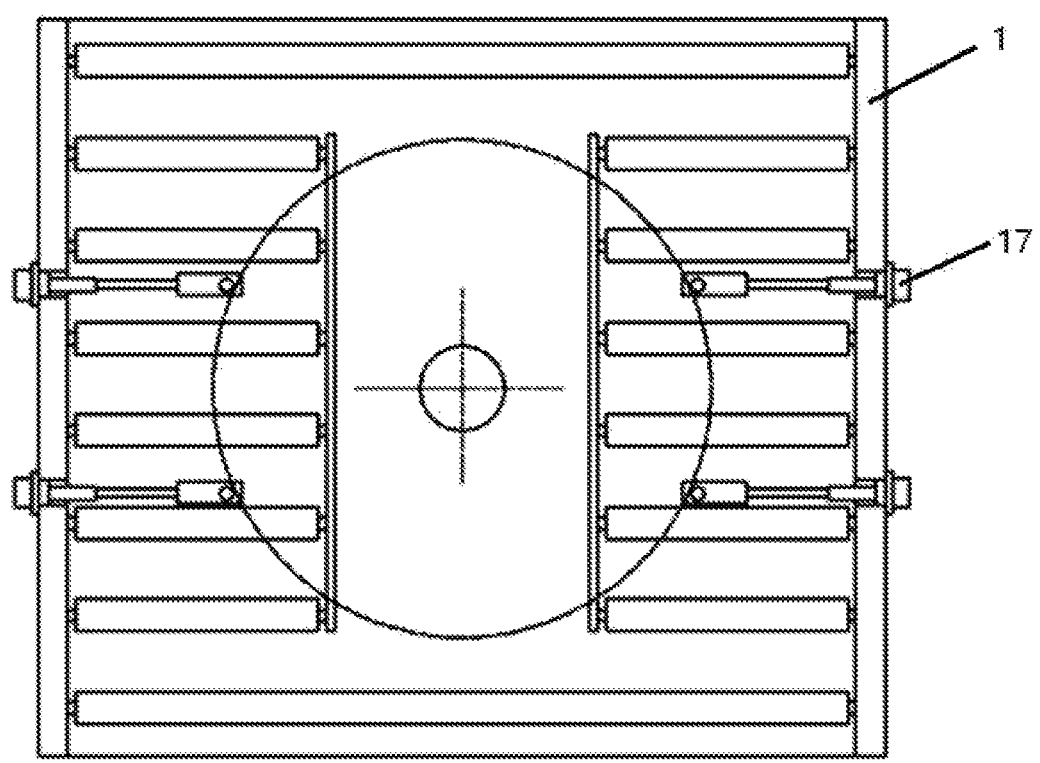
FIG. 3 is a top view of the wheel correcting device according to the present application.
Figure 4:
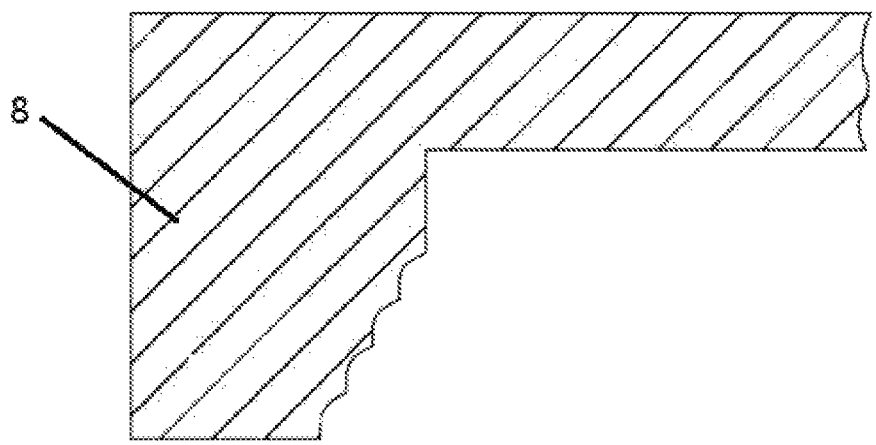
FIG. 4 is a partial view of a correction cutter head of the wheel correcting device according to the present application.

In which, 1—frame, 2—feed lower support plate, 3—feed sliding plate, 4—expansion cylinder, 5—axial positioning plate, 6—expansion sleeve, 7—expansion core, 8—correction cutter head, 9—bearing, 10—correction motor, 11—coupling, 12—shaft, 13—positioning rod, 14—positioning sliding block, 15—positioning guide rail, 16—positioning support plate, 17—positioning cylinder, 18—feed guide rail, 19—reinforcing rib, 20—ball, 21—lead screw, 22—feed side support plate, 23—feed motor.

DETAILED DESCRIPTION OF THE INVENTION

The details and working conditions of the specific device proposed by the present application will be described below in combination with the accompanying drawings.

A wheel correction device is mainly composed of a frame 1, a feed lower support plate 2, a feed sliding plate 3, an expansion cylinder 4, an axial positioning plate 5, an expansion sleeve 6, an expansion core 7, a correction cutter head 8, a bearing 9, a correction motor 10, a coupling 11, a shaft 12, positioning rods 13, positioning sliding blocks 14, positioning guide rails 15, positioning support plates 16, positioning cylinders 17, a feed guide rail 18, a reinforcing rib 19, a ball 20, a lead screw 21, a feed side support plate 22 and a feed motor 23. The positioning support plates 16 are mounted on the frame 1, the positioning guide rails 15 are mounted on the positioning support plates 16, the positioning sliding blocks 14 are connected to the positioning guide rails 15, the positioning rods 13 are fixed on the positioning sliding blocks 14, the four positioning cylinders 17 are respectively connected with the four positioning sliding blocks 14 to drive the four positioning sliding blocks 14 to move synchronously so as to control synchronous centering of the four positioning rods 13 and complete initial positioning of a hub, and this is a hub positioning unit; the feed lower support plate 2 is mounted on the frame 1, the feed side support plate 22 and the feed motor 23 are mounted on the feed lower support plate 2, the feed side support plate 22 is connected with the frame 1 through the reinforcing rib 19 to play a role in stabilizing, the ball 20, the lead screw 21, the feed guide rail 18 and the feed sliding plate 3 are mounted on the feed side support plate 22, the expansion cylinder 4, the axial positioning plate 5 and the expansion sleeve 6 are mounted on the feed sliding plate 3, the axial positioning plate 5 completes axial positioning of the hub, the expansion cylinder 4 drives the expansion core 7 to complete radial positioning of the hub, the hub is fixed while being expanded, the feed motor 23 drives the feed sliding plate 3 to move up and down through the ball 20 and the screw 21 so as to drive the fixed hub to achieve up-down feed movement, and this is a hub feed unit; and the correction motor 10 is mounted at upper part of the frame 1, output end of the correction motor 10 is connected to the shaft 12 through the coupling 11, the correction cutter head 8 is mounted on the shaft 12, stepped cutting edges having different outer diameters are annularly distributed in the correction cutter head 8, a standard outer diameter cutting edge is composed of three parts, lower cutting edge is vertical, upper cutting edge is at an angle of 30 degrees to the horizontal line, middle connection part is an R2.5 arc cutting edge, the correction motor 10 may control the rotation of the correction cutter head 8, and this is a tool correction unit.

The working process of the wheel correcting device is as follows: the correction motor 10 is started first so that the correction cutter head 8 is always in a rotating state, a machined semi-finished product reaches a position below the device, the four positioning cylinders 17 move synchronously to center the hub and complete initial positioning of the hub, then the feed motor 23 is started to drive the feed sliding plate 3 to move up, the feed sliding plate 3 stops moving when the axial positioning plate 5 contacts flange surface of the hub, the expansion cylinder 4 is started to expand the hub, then the positioning cylinders 17 are reset, the positioning rods 13 leave the hub, next, the feed motor 23 is started again to drive the hub to move up continuously, the hub stops moving when fillets of wheel rim contact fillets of the stepped cutting edges, the hub is lowered onto a roller bed after correcting, the expansion sleeve 6 is released, the hub feed unit is reset, the roller bed rotates to carry away the corrected hub and receives next wheel to be corrected, and so on.

The device of the present application may meet the process requirements of wheels in flow production, improve the runout and balance qualified rate of products and solve the problems of decentraction of the outer diameter in the first procedure and the second procedure and deformation of rim bulges, and has the characteristics of simple operation, high efficiency, practicability, convenient manufacture and the like.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for correcting an aluminum alloy wheel, comprising a frame, a feed lower support plate, a feed sliding plate, an expansion cylinder, an axial positioning plate, an expansion sleeve, an expansion core, a correction cutter head, a bearing, a correction motor, a coupling, a shaft, four positioning rods, four positioning sliding blocks, positioning guide rails, positioning support plates, four positioning cylinders, a feed guide rail, a reinforcing rib, a ball, a lead screw, a feed side support plate and a feed motor:

the device for correcting an aluminum alloy wheel comprises a hub positioning unit, in which the positioning support plates are mounted on the frame, the positioning guide rails are mounted on the positioning support plate, the four positioning sliding blocks are connected to the positioning guide rails, the four positioning rods are fixed on the four positioning sliding blocks, and the four positioning cylinders are respectively connected with the four positioning sliding blocks to drive the four positioning sliding blocks to move synchronously so as to control synchronous centering of the four positioning rods and complete initial positioning of a hub;

the device for correcting an aluminum alloy wheel comprises a hub feed unit, in which the feed side support plate and the feed motor are mounted on the feed lower support plate, the feed side support plate is connected with the frame through the reinforcing rib to play a role in stabilizing, the axial positioning plate completes axial positioning of the hub, the expansion cylinder drives the expansion core to complete radial positioning of the hub, the hub is fixed while being expanded, and the feed motor drives the feed sliding plate to move up and down through the ball and the screw so as to drive the fixed hub to achieve up-down feed movement; and the device for correcting an aluminum alloy wheel comprises a tool correction unit, in which stepped cutting edges having different outer diameters are annularly distributed in the correction cutter head, a standard outer diameter cutting edge comprises three parts, lower cutting edge is vertical, upper cutting edge is at an angle of 30 degrees to a horizontal line, middle connection part is a cutting edge, the cutting edge has a R2.5 arc, that is to say, the cutting edge has an arc and the radius of the arc is 2.5 cm, and the correction motor is configured to control the rotation of the correction cutter head.

* * * * *